US008548794B2

(12) United States Patent
Koehn

(10) Patent No.: US 8,548,794 B2
(45) Date of Patent: Oct. 1, 2013

(54) STATISTICAL NOUN PHRASE TRANSLATION

(75) Inventor: Philipp Koehn, Cambridge, MA (US)

(73) Assignee: University of Southern California, Los Angeles, CA (US)

( * ) Notice: Subject to any disclaimer, the term of this patent is extended or adjusted under 35 U.S.C. 154(b) by 1844 days.

(21) Appl. No.: 10/884,175

(22) Filed: Jul. 2, 2004

(65) Prior Publication Data

US 2005/0038643 A1    Feb. 17, 2005

Related U.S. Application Data

(60) Provisional application No. 60/484,810, filed on Jul. 2, 2003.

(51) Int. Cl.
*G06F 17/28* (2006.01)
*G06F 17/20* (2006.01)
*G06F 17/27* (2006.01)
*G06F 17/21* (2006.01)
*G10L 15/20* (2006.01)
*G10L 21/00* (2006.01)

(52) U.S. Cl.
USPC ............... 704/4; 704/1; 704/2; 704/5; 704/9; 704/10; 704/270; 704/270.1; 704/275

(58) Field of Classification Search
USPC ............ 704/2, 4, 5, 10, 9, 233, 1, 270, 270.1, 704/275
See application file for complete search history.

(56) References Cited

U.S. PATENT DOCUMENTS

| 4,502,128 A | 2/1985 | Okajima et al. |
| 4,599,691 A | 7/1986 | Sakaki et al. |
| 4,615,002 A | 9/1986 | Innes |
| 4,661,924 A | 4/1987 | Okamoto et al. |
| 4,787,038 A | 11/1988 | Doi et al. |
| 4,791,587 A | 12/1988 | Doi |
| 4,800,522 A | 1/1989 | Miyao et al. |
| 4,814,987 A | 3/1989 | Miyao et al. |
| 4,942,526 A | 7/1990 | Okajima et al. |

(Continued)

FOREIGN PATENT DOCUMENTS

| EP | 0469884 A2 | 2/1992 |
| EP | 0715265 A2 | 6/1996 |

(Continued)

OTHER PUBLICATIONS

Och et al., Discriminative training and maximum entropy models for statistical machine translation. In Proc. of the 40th Annual Meeting of the Association for Computational (ACL), Philadelphia, PA, Jul. 2002.*

(Continued)

*Primary Examiner* — Edgar Guerra-Erazo
(74) *Attorney, Agent, or Firm* — Carr & Ferrell LLP

(57) ABSTRACT

A statistical machine translation (MT) system may include a noun phrase/prepositional phrase (NP/PP) translation subsystem to translation NP/PPs as a subtask in an MT operation. The NP/PP translation subsystem may use a model trained on an NP/PP corpus and a decoder to generate an n-best list of candidate translations and a re-ranker to re-rank the candidate translations based on a machine learning method and additional features based on known properties of NP/PPs.

26 Claims, 4 Drawing Sheets

(56) References Cited

U.S. PATENT DOCUMENTS

| | | | |
|---|---|---|---|
| 4,980,829 A | 12/1990 | Okajima et al. | |
| 5,020,112 A | 5/1991 | Chou | |
| 5,088,038 A | 2/1992 | Tanaka et al. | |
| 5,091,876 A | 2/1992 | Kumano et al. | |
| 5,146,405 A | 9/1992 | Church | |
| 5,167,504 A | 12/1992 | Mann | |
| 5,181,163 A | 1/1993 | Nakajima et al. | |
| 5,212,730 A | 5/1993 | Wheatley et al. | |
| 5,218,537 A | 6/1993 | Hemphill et al. | |
| 5,220,503 A * | 6/1993 | Suzuki et al. | 704/2 |
| 5,267,156 A | 11/1993 | Nomiyama | |
| 5,268,839 A | 12/1993 | Kaji | |
| 5,295,068 A | 3/1994 | Nishino et al. | |
| 5,302,132 A | 4/1994 | Corder | |
| 5,311,429 A | 5/1994 | Tominaga | |
| 5,387,104 A | 2/1995 | Corder | |
| 5,432,948 A | 7/1995 | Davis et al. | |
| 5,442,546 A | 8/1995 | Kaji et al. | |
| 5,477,450 A | 12/1995 | Takeda et al. | |
| 5,477,451 A * | 12/1995 | Brown et al. | 704/9 |
| 5,495,413 A * | 2/1996 | Kutsumi et al. | 704/4 |
| 5,497,319 A | 3/1996 | Chong et al. | |
| 5,510,981 A | 4/1996 | Berger et al. | |
| 5,528,491 A | 6/1996 | Kuno et al. | |
| 5,535,120 A | 7/1996 | Chong et al. | |
| 5,541,836 A | 7/1996 | Church et al. | |
| 5,541,837 A | 7/1996 | Fushimoto | |
| 5,548,508 A | 8/1996 | Nagami | |
| 5,644,774 A | 7/1997 | Fukumochi et al. | |
| 5,675,815 A | 10/1997 | Yamauchi et al. | |
| 5,687,383 A | 11/1997 | Nakayama et al. | |
| 5,696,980 A | 12/1997 | Brew | |
| 5,724,593 A | 3/1998 | Hargrave, III et al. | |
| 5,752,052 A | 5/1998 | Richardson et al. | |
| 5,754,972 A | 5/1998 | Baker et al. | |
| 5,761,631 A | 6/1998 | Nasukawa | |
| 5,761,689 A | 6/1998 | Rayson et al. | |
| 5,768,603 A | 6/1998 | Brown et al. | |
| 5,779,486 A | 7/1998 | Ho et al. | |
| 5,781,884 A | 7/1998 | Pereira et al. | |
| 5,794,178 A | 8/1998 | Caid et al. | |
| 5,805,832 A | 9/1998 | Brown et al. | |
| 5,806,032 A | 9/1998 | Sproat | |
| 5,819,265 A | 10/1998 | Ravin et al. | |
| 5,826,219 A * | 10/1998 | Kutsumi | 704/4 |
| 5,826,220 A | 10/1998 | Takeda et al. | |
| 5,845,143 A | 12/1998 | Yamauchi et al. | |
| 5,848,385 A | 12/1998 | Poznanski et al. | |
| 5,848,386 A | 12/1998 | Motoyama | |
| 5,855,015 A | 12/1998 | Shoham | |
| 5,864,788 A * | 1/1999 | Kutsumi | 704/2 |
| 5,867,811 A | 2/1999 | O'Donoghue | |
| 5,870,706 A | 2/1999 | Alshawi | |
| 5,893,134 A | 4/1999 | O'Donoghue et al. | |
| 5,903,858 A | 5/1999 | Saraki | |
| 5,907,821 A | 5/1999 | Kaji et al. | |
| 5,909,681 A | 6/1999 | Passera et al. | |
| 5,930,746 A * | 7/1999 | Ting | 704/9 |
| 5,966,685 A | 10/1999 | Flanagan et al. | |
| 5,983,169 A * | 11/1999 | Kozma | 704/2 |
| 5,987,402 A | 11/1999 | Murata et al. | |
| 5,987,404 A | 11/1999 | Della Pietra et al. | |
| 5,991,710 A | 11/1999 | Papineni et al. | |
| 5,995,922 A | 11/1999 | Penteroudakis et al. | |
| 6,018,617 A | 1/2000 | Sweitzer et al. | |
| 6,031,984 A | 2/2000 | Walser | |
| 6,032,111 A | 2/2000 | Mohri | |
| 6,064,819 A | 5/2000 | Franssen et al. | |
| 6,064,951 A | 5/2000 | Park et al. | |
| 6,073,143 A | 6/2000 | Nishikawa et al. | |
| 6,077,085 A | 6/2000 | Parry et al. | |
| 6,092,034 A | 7/2000 | McCarley et al. | |
| 6,119,077 A | 9/2000 | Shinozaki | |
| 6,131,082 A | 10/2000 | Hargrave, III et al. | |
| 6,161,082 A | 12/2000 | Goldberg et al. | |
| 6,182,014 B1 | 1/2001 | Kenyon et al. | |
| 6,182,027 B1 | 1/2001 | Nasukawa et al. | |
| 6,205,456 B1 | 3/2001 | Nakao | |
| 6,206,700 B1 | 3/2001 | Brown et al. | |
| 6,223,150 B1 | 4/2001 | Duan et al. | |
| 6,233,544 B1 | 5/2001 | Alshawi | |
| 6,233,545 B1 | 5/2001 | Datig | |
| 6,233,546 B1 | 5/2001 | Datig | |
| 6,236,958 B1 | 5/2001 | Lange et al. | |
| 6,269,351 B1 | 7/2001 | Black | |
| 6,275,789 B1 | 8/2001 | Moser et al. | |
| 6,278,967 B1 | 8/2001 | Akers et al. | |
| 6,278,969 B1 | 8/2001 | King et al. | |
| 6,285,978 B1 | 9/2001 | Bernth et al. | |
| 6,289,302 B1 | 9/2001 | Kuo | |
| 6,304,841 B1 | 10/2001 | Berger et al. | |
| 6,311,152 B1 | 10/2001 | Bai et al. | |
| 6,317,708 B1 | 11/2001 | Witbrock et al. | |
| 6,327,568 B1 | 12/2001 | Joost | |
| 6,330,529 B1 | 12/2001 | Ito | |
| 6,330,530 B1 | 12/2001 | Horiguchi et al. | |
| 6,356,864 B1 | 3/2002 | Foltz et al. | |
| 6,360,196 B1 | 3/2002 | Poznanski et al. | |
| 6,389,387 B1 | 5/2002 | Poznanski et al. | |
| 6,393,388 B1 | 5/2002 | Franz et al. | |
| 6,393,389 B1 | 5/2002 | Chanod et al. | |
| 6,415,250 B1 | 7/2002 | van den Akker | |
| 6,460,015 B1 | 10/2002 | Hetherington et al. | |
| 6,470,306 B1 | 10/2002 | Pringle et al. | |
| 6,473,729 B1 | 10/2002 | Gastaldo et al. | |
| 6,480,698 B2 | 11/2002 | Ho et al. | |
| 6,490,549 B1 | 12/2002 | Ulicny et al. | |
| 6,498,921 B1 | 12/2002 | Ho et al. | |
| 6,502,064 B1 | 12/2002 | Miyahira et al. | |
| 6,529,865 B1 | 3/2003 | Duan et al. | |
| 6,535,842 B1 | 3/2003 | Roche et al. | |
| 6,587,844 B1 | 7/2003 | Mohri | |
| 6,609,087 B1 * | 8/2003 | Miller et al. | 703/22 |
| 6,647,364 B1 | 11/2003 | Yumura et al. | |
| 6,691,279 B2 | 2/2004 | Yoden et al. | |
| 6,745,161 B1 | 6/2004 | Arnold et al. | |
| 6,757,646 B2 | 6/2004 | Marchisio | |
| 6,778,949 B2 | 8/2004 | Duan et al. | |
| 6,782,356 B1 | 8/2004 | Lopke | |
| 6,810,374 B2 | 10/2004 | Kang | |
| 6,848,080 B1 | 1/2005 | Lee et al. | |
| 6,857,022 B1 | 2/2005 | Scanlan | |
| 6,885,985 B2 | 4/2005 | Hull | |
| 6,901,361 B1 | 5/2005 | Portilla | |
| 6,904,402 B1 | 6/2005 | Wang et al. | |
| 6,952,665 B1 | 10/2005 | Shimomura et al. | |
| 6,983,239 B1 | 1/2006 | Epstein | |
| 6,996,518 B2 | 2/2006 | Jones et al. | |
| 6,996,520 B2 | 2/2006 | Levin | |
| 6,999,925 B2 | 2/2006 | Fischer et al. | |
| 7,013,262 B2 | 3/2006 | Tokuda et al. | |
| 7,016,827 B1 | 3/2006 | Ramaswamy et al. | |
| 7,016,977 B1 | 3/2006 | Dunsmoir et al. | |
| 7,024,351 B2 | 4/2006 | Wang | |
| 7,031,911 B2 * | 4/2006 | Zhou et al. | 704/10 |
| 7,050,964 B2 * | 5/2006 | Menzes et al. | 704/2 |
| 7,085,708 B2 * | 8/2006 | Manson | 704/9 |
| 7,089,493 B2 | 8/2006 | Hatori et al. | |
| 7,103,531 B2 | 9/2006 | Moore | |
| 7,107,204 B1 | 9/2006 | Liu et al. | |
| 7,107,215 B2 | 9/2006 | Ghali | |
| 7,113,903 B1 * | 9/2006 | Riccardi et al. | 704/4 |
| 7,143,036 B2 * | 11/2006 | Weise | 704/245 |
| 7,146,358 B1 | 12/2006 | Gravano et al. | |
| 7,149,688 B2 | 12/2006 | Schalkwyk | |
| 7,174,289 B2 | 2/2007 | Sukehiro | |
| 7,177,792 B2 | 2/2007 | Knight et al. | |
| 7,191,115 B2 | 3/2007 | Moore | |
| 7,197,451 B1 | 3/2007 | Carter et al. | |
| 7,206,736 B2 | 4/2007 | Moore | |
| 7,209,875 B2 | 4/2007 | Quirk et al. | |
| 7,219,051 B2 | 5/2007 | Moore | |
| 7,239,998 B2 | 7/2007 | Xun | |
| 7,249,012 B2 * | 7/2007 | Moore | 704/4 |

| Patent Number | Date | Inventor(s) | Ref |
|---|---|---|---|
| 7,249,013 B2 * | 7/2007 | Al-Onaizan et al. | 704/9 |
| 7,283,950 B2 | 10/2007 | Pournasseh et al. | |
| 7,295,962 B2 | 11/2007 | Marcu | |
| 7,302,392 B1 | 11/2007 | Thenthiruperai et al. | |
| 7,319,949 B2 | 1/2008 | Pinkham | |
| 7,340,388 B2 | 3/2008 | Soricut et al. | |
| 7,346,487 B2 | 3/2008 | Li | |
| 7,346,493 B2 | 3/2008 | Ringger et al. | |
| 7,349,839 B2 | 3/2008 | Moore | |
| 7,356,457 B2 | 4/2008 | Pinkham et al. | |
| 7,369,998 B2 | 5/2008 | Sarich et al. | |
| 7,373,291 B2 | 5/2008 | Garst | |
| 7,383,542 B2 | 6/2008 | Richardson et al. | |
| 7,389,222 B1 | 6/2008 | Langmead et al. | |
| 7,389,234 B2 | 6/2008 | Schmid et al. | |
| 7,403,890 B2 * | 7/2008 | Roushar | 704/9 |
| 7,409,332 B2 | 8/2008 | Moore | |
| 7,409,333 B2 | 8/2008 | Wilkinson et al. | |
| 7,447,623 B2 | 11/2008 | Appleby | |
| 7,454,326 B2 | 11/2008 | Marcu et al. | |
| 7,496,497 B2 | 2/2009 | Liu | |
| 7,533,013 B2 | 5/2009 | Marcu | |
| 7,536,295 B2 | 5/2009 | Cancedda et al. | |
| 7,546,235 B2 | 6/2009 | Brockett et al. | |
| 7,565,281 B2 | 7/2009 | Appleby | |
| 7,574,347 B2 | 8/2009 | Wang | |
| 7,580,830 B2 | 8/2009 | Al-Onaizan et al. | |
| 7,620,538 B2 | 11/2009 | Marcu et al. | |
| 7,624,005 B2 * | 11/2009 | Koehn et al. | 704/2 |
| 7,624,020 B2 | 11/2009 | Yamada et al. | |
| 7,627,479 B2 | 12/2009 | Travieso et al. | |
| 7,680,646 B2 | 3/2010 | Lux-Pogodalla et al. | |
| 7,689,405 B2 | 3/2010 | Marcu | |
| 7,698,125 B2 | 4/2010 | Graehl et al. | |
| 7,707,025 B2 | 4/2010 | Whitelock | |
| 7,711,545 B2 | 5/2010 | Koehn | |
| 7,716,037 B2 | 5/2010 | Precoda et al. | |
| 7,813,918 B2 | 10/2010 | Muslea et al. | |
| 7,925,494 B2 | 4/2011 | Cheng et al. | |
| 7,974,833 B2 | 7/2011 | Soricut et al. | |
| 8,060,360 B2 | 11/2011 | He | |
| 8,145,472 B2 | 3/2012 | Shore et al. | |
| 2001/0009009 A1 | 7/2001 | Iizuka | |
| 2001/0029455 A1 | 10/2001 | Chin et al. | |
| 2002/0002451 A1 | 1/2002 | Sukehiro | |
| 2002/0013693 A1 | 1/2002 | Fuji | |
| 2002/0040292 A1 | 4/2002 | Marcu | |
| 2002/0046018 A1 | 4/2002 | Marcu et al. | |
| 2002/0046262 A1 | 4/2002 | Heilig et al. | |
| 2002/0078091 A1 | 6/2002 | Vu et al. | |
| 2002/0099744 A1 | 7/2002 | Coden et al. | |
| 2002/0111788 A1 | 8/2002 | Kimpara | |
| 2002/0111789 A1 | 8/2002 | Hull | |
| 2002/0111967 A1 | 8/2002 | Nagase | |
| 2002/0152063 A1 | 10/2002 | Tokieda et al. | |
| 2002/0169592 A1 | 11/2002 | Aityan | |
| 2002/0188438 A1 | 12/2002 | Knight et al. | |
| 2002/0188439 A1 | 12/2002 | Marcu | |
| 2002/0198699 A1 | 12/2002 | Greene et al. | |
| 2002/0198701 A1 | 12/2002 | Moore | |
| 2002/0198713 A1 * | 12/2002 | Franz et al. | 704/252 |
| 2003/0009322 A1 | 1/2003 | Marcu | |
| 2003/0023423 A1 * | 1/2003 | Yamada et al. | 704/2 |
| 2003/0144832 A1 | 7/2003 | Harris | |
| 2003/0154071 A1 | 8/2003 | Shreve | |
| 2003/0158723 A1 | 8/2003 | Masuichi et al. | |
| 2003/0176995 A1 | 9/2003 | Sukehiro | |
| 2003/0182102 A1 | 9/2003 | Corston-Oliver et al. | |
| 2003/0191626 A1 | 10/2003 | Al-Onaizan et al. | |
| 2003/0204400 A1 | 10/2003 | Marcu et al. | |
| 2003/0216905 A1 * | 11/2003 | Chelba et al. | 704/9 |
| 2003/0217052 A1 | 11/2003 | Rubenczyk et al. | |
| 2003/0233222 A1 | 12/2003 | Soricut et al. | |
| 2004/0015342 A1 | 1/2004 | Garst | |
| 2004/0024581 A1 * | 2/2004 | Koehn et al. | 704/2 |
| 2004/0030551 A1 | 2/2004 | Marcu et al. | |
| 2004/0035055 A1 | 2/2004 | Zhu et al. | |
| 2004/0059708 A1 | 3/2004 | Dean et al. | |
| 2004/0068411 A1 | 4/2004 | Scanlan | |
| 2004/0098247 A1 | 5/2004 | Moore | |
| 2004/0102957 A1 | 5/2004 | Levin | |
| 2004/0111253 A1 | 6/2004 | Luo et al. | |
| 2004/0122656 A1 | 6/2004 | Abir | |
| 2004/0167768 A1 | 8/2004 | Travieso et al. | |
| 2004/0167784 A1 | 8/2004 | Travieso et al. | |
| 2004/0193401 A1 | 9/2004 | Ringger et al. | |
| 2004/0230418 A1 | 11/2004 | Kitamura | |
| 2004/0237044 A1 | 11/2004 | Travieso et al. | |
| 2004/0260532 A1 | 12/2004 | Richardson et al. | |
| 2005/0021322 A1 | 1/2005 | Richardson et al. | |
| 2005/0021517 A1 | 1/2005 | Marchisio | |
| 2005/0026131 A1 | 2/2005 | Elzinga et al. | |
| 2005/0033565 A1 | 2/2005 | Koehn | |
| 2005/0060160 A1 | 3/2005 | Roh et al. | |
| 2005/0075858 A1 | 4/2005 | Pournasseh et al. | |
| 2005/0102130 A1 | 5/2005 | Quirk et al. | |
| 2005/0125218 A1 | 6/2005 | Rajput et al. | |
| 2005/0149315 A1 | 7/2005 | Flanagan et al. | |
| 2005/0171757 A1 | 8/2005 | Appleby | |
| 2005/0204002 A1 | 9/2005 | Friend | |
| 2005/0228640 A1 | 10/2005 | Aue et al. | |
| 2005/0228642 A1 | 10/2005 | Mau et al. | |
| 2005/0228643 A1 | 10/2005 | Munteanu et al. | |
| 2005/0234701 A1 | 10/2005 | Graehl et al. | |
| 2005/0267738 A1 | 12/2005 | Wilkinson et al. | |
| 2006/0004563 A1 * | 1/2006 | Campbell et al. | 704/9 |
| 2006/0015320 A1 | 1/2006 | Och | |
| 2006/0015323 A1 | 1/2006 | Udupa et al. | |
| 2006/0018541 A1 | 1/2006 | Chelba et al. | |
| 2006/0020448 A1 | 1/2006 | Chelba et al. | |
| 2006/0095248 A1 | 5/2006 | Menezes et al. | |
| 2006/0111891 A1 | 5/2006 | Menezes et al. | |
| 2006/0111892 A1 | 5/2006 | Menezes et al. | |
| 2006/0111896 A1 | 5/2006 | Menezes et al. | |
| 2006/0129424 A1 | 6/2006 | Chan | |
| 2006/0142995 A1 | 6/2006 | Knight et al. | |
| 2006/0150069 A1 | 7/2006 | Chang | |
| 2006/0190241 A1 | 8/2006 | Goutte et al. | |
| 2007/0016400 A1 | 1/2007 | Soricutt et al. | |
| 2007/0016401 A1 | 1/2007 | Ehsani et al. | |
| 2007/0033001 A1 | 2/2007 | Muslea et al. | |
| 2007/0094169 A1 | 4/2007 | Yamada et al. | |
| 2007/0112553 A1 | 5/2007 | Jacobson | |
| 2007/0112555 A1 | 5/2007 | Lavi et al. | |
| 2007/0112556 A1 | 5/2007 | Lavi et al. | |
| 2007/0122792 A1 | 5/2007 | Galley et al. | |
| 2007/0168450 A1 | 7/2007 | Prajapat et al. | |
| 2007/0180373 A1 | 8/2007 | Bauman et al. | |
| 2007/0219774 A1 | 9/2007 | Quirk et al. | |
| 2007/0250306 A1 | 10/2007 | Marcu et al. | |
| 2007/0269775 A1 | 11/2007 | Andreev et al. | |
| 2007/0294076 A1 | 12/2007 | Shore et al. | |
| 2008/0052061 A1 | 2/2008 | Kim et al. | |
| 2008/0114583 A1 | 5/2008 | Al-Onaizan et al. | |
| 2008/0154581 A1 | 6/2008 | Lavi et al. | |
| 2008/0183555 A1 | 7/2008 | Walk | |
| 2008/0215418 A1 | 9/2008 | Kolve et al. | |
| 2008/0249760 A1 | 10/2008 | Marcu et al. | |
| 2008/0270109 A1 | 10/2008 | Och | |
| 2008/0270112 A1 | 10/2008 | Shimohata | |
| 2008/0281578 A1 | 11/2008 | Kumaran et al. | |
| 2008/0307481 A1 | 12/2008 | Panje | |
| 2009/0076792 A1 | 3/2009 | Lawson-Tancred | |
| 2009/0083023 A1 | 3/2009 | Foster et al. | |
| 2009/0119091 A1 | 5/2009 | Sarig | |
| 2009/0326912 A1 | 12/2009 | Ueffing | |
| 2010/0017293 A1 | 1/2010 | Lung et al. | |
| 2010/0042398 A1 | 2/2010 | Marcu et al. | |
| 2010/0174524 A1 | 7/2010 | Koehn | |
| 2011/0029300 A1 | 2/2011 | Marcu et al. | |
| 2011/0082684 A1 | 4/2011 | Soricut et al. | |

FOREIGN PATENT DOCUMENTS

| | | |
|---|---|---|
| EP | 0933712 A2 | 8/1999 |
| EP | 0933712 A3 | 1/2001 |
| JP | 07244666 | 1/1995 |
| JP | 10011447 | 1/1998 |
| JP | 11272672 | 10/1999 |

OTHER PUBLICATIONS

Schmidt, H. and Schulte im Walde, S. (2000). Robust German noun chunking with a probabilistic context-free grammar. In Proceedings of COLING.*

Kupiec, Julian. 1993. An algorithm for finding noun phrase correspondences in bilingual corpora. In Proceedings of the 31st Annual Meeting of the ACL, pp. 17-22.*

Och et al., "Discriminative training and maximum entropy models for statistical machine translation." In Proc. of the 40th Annual Meeting of the Association for Computational Linguistics (ACL), Philadelphia, PA, Jul. 2002.*

Abney, Stephen, "Parsing By Chunks," 1991, Principle-Based Parsing: Computation and Psycholinguistics, vol. 44, pp. 257-279.

Al-Onaizan et al., "Statistical Machine Translation," 1999, JHU Summer Tech Workshop, Final Report, pp. 1-42.

Al-Onaizan, Y. and Knight, K., "Named Entity Translation: Extended Abstract" 2002, Proceedings of HLT-02, San Diego, CA.

Al-Onaizan, Y. and Knight, K., "Translating Named Entities Using Monolingual and Bilingual Resources," 2002, Proc. of the 40th Annual Meeting of the ACL,pp. 400-408.

Al-Onaizan et al., "Translating with Scarce Resources," 2000, 17th National Conference of the American Association for Artificial Intelligence, Austin, TX, pp. 672-678.

Alshawi et al., "Learning Dependency Translation Models as Collections of Finite-State Head Transducers," 2000, Computational Linguistics, vol. 26, pp. 45-60.

Arbabi et al., "Algorithms for Arabic name transliteration," Mar. 1994, IBM Journal of Research and Development, vol. 38, Issue 2, pp. 183-194.

Barnett et al., "Knowledge and Natural Language Processing," Aug. 1990, Communications of the ACM, vol. 33, Issue 8, pp. 50-71.

Bangalore, S. and Rambow, O., "Corpus-Based Lexical Choice in Natural Language Generation," 2000, Proc. of the 38th Annual ACL, Hong Kong, pp. 464-471.

Bangalore, S. And Rambow, O., "Exploiting a Probabilistic Hierarchical Model for Generation," 2000, Proc. of 18th conf. on Computational Linguistics, vol. 1, pp. 42-48.

Bangalore, S. and Rambow, O., "Evaluation Metrics for Generation," 2000, Proc. of the 1st International Natural Language Generation Conf., vol. 14, p. 1-8.

Bangalore, S. and Rambow, O., "Using TAGs, a Tree Model, and a Language Model for Generation," May 2000, Workshop TAG+5, Paris.

Baum, Leonard, "An Inequality and Associated Maximization Technique in Statistical Estimation for Probabilistic Functions of Markov Processes", 1972, Inequalities 3:1-8.

Bikel et al., "An Algorithm that Learns What's in a Name," 1999, Machine Learning Journal Special Issue on Natural Language Learning, vol. 34, pp. 211-232.

Brants, Thorsten, "TnT—A Statistical Part-of-Speech Tagger," 2000, Proc. of the 6th Applied Natural Language Processing Conference, Seattle.

Brill, Eric. "Transformation-Based Error-Driven Learning and Natural Language Processing: A Case Study in Part of Speech Tagging", 1995, Computational Linguistics, vol. 21, No. 4, pp. 543-565.

Brown et al., "A Statistical Approach to Machine Translation," Jun. 1990, Computational Linguistics,. vol. 16, No. 2, pp. 79-85.

Brown, Ralf, "Automated Dictionary Extraction for "Knowledge-Free" Example-Based Translation," 1997, Proc. of 7th Int'l Conf. on Theoretical and Methodological Issues in MT, Santa Fe, NM, pp. 111-118.

Brown et al., "The Mathematics of Statistical Machine Translation: Parameter Estimation," 1993, Computational Linguistics, vol. 19, Issue 2, pp. 263-311.

Brown et al., "Word-Sense Disambiguation Using Statistical Methods," 1991, Proc. of 29th Annual ACL, pp. 264-270.

Carl, Michael. "A Constructivist Approach to Machine Translation," 1998, New Methods of Language Processing and Computational Natural Language Learning, pp. 247-256.

Chen, K. and Chen, H., "Machine Translation: An Integrated Approach," 1995, Proc. of 6th Int'l Conf. on Theoretical and Methodological Issue in MT, pp. 287-294.

Chinchor, Nancy, "MUC-7 Named Entity Task Definition," 1997, Version 3.5.

Clarkson, P. and Rosenfeld, R., "Statistical Language Modeling Using the CMU-Cambridge Toolkit", 1997, Proc. ESCA Eurospeech, Rhodes, Greece, pp. 2707-2710.

Corston-Oliver, Simon, "Beyond String Matching and Cue Phrases: Improving Efficiency and Coverage in Discourse Analysis",1998, The AAAI Spring Symposium on Intelligent Text Summarization, pp. 9-15.

Dagan, I. and Itai, A., "Word Sense Disambiguation Using a Second Language Monolingual Corpus", 1994, Computational Linguistics, vol. 20, No. 4, pp. 563-596.

Dempster et al., "Maximum Likelihood from Incomplete Data via the EM Algorithm", 1977, Journal of the Royal Statistical Society, vol. 39, No. 1, pp. 1-38.

Diab, M. and Finch, S., "A Statistical Word-Level Translation Model for Comparable Corpora," 2000, In Proc.of the Conference on ContentBased Multimedia Information Access (RIAO).

Elhadad, M. and Robin, J., "An Overview of SURGE: a Reusable Comprehensive Syntactic Realization Component," 1996, Technical Report 96-03, Department of Mathematics and Computer Science, Ben Gurion University, Beer Sheva, Israel.

Elhadad, M. and Robin, J., "Controlling Content Realization with Functional Unification Grammars", 1992, Aspects of Automated Natural Language Generation, Dale et al. (eds)., Springer Verlag, pp. 89-104.

Elhadad et al., "Floating Constraints in Lexical Choice", 1996, ACL, 23(2): 195-239.

Elhadad, Michael, "FUF: the Universal Unifier User Manual Version 5.2", 1993, Department of Computer Science, Ben Gurion University, Beer Sheva, Israel.

Elhadad. M. and Robin, J., "SURGE: a Comprehensive Plug-in Syntactic Realization Component for Text Generation", 1999 (available at http://www.cs.bgu.ac.il/~elhadad/pub.html).

Elhadad, Michael, "Using Argumentation to Control Lexical Choice: A Functional Unification Implementation", 1992, Ph.D. Thesis, Graduate School of Arts and Sciences, Columbia University.

Fung, Pascale, "Compiling Bilingual Lexicon Entries From a Non-Parallel English-Chinese Corpus", 1995, Proc. of the Third Workshop on Very Large Corpora, Boston, MA, pp. 173-183.

Fung, P. and Yee, L., "An IR Approach for Translating New Words from Nonparallel, Comparable Texts", 1998, 36th Annual Meeting of the ACL, 17th International Conference on Computational Linguistics, pp. 414-420.

Gale, W. and Church, K., "A Program for Aligning Sentences in Bilingual Corpora," 1991, 29th Annual Meeting of the ACL, pp. 177-183.

Germann, Ulrich, "Building a Statistical Machine Translation System from Scratch: How Much Bang for the Buck Can We Expect?" Proc. of the Data-Driven MT Workshop of ACL-01, Toulouse, France, 2001.

Germann et al., "Fast Decoding and Optimal Decoding for Machine Translation", 2001, Proc. of the 39th Annual Meeting of the ACL, Toulouse, France, pp. 228-235.

Diab, Mona, "An Unsupervised Method for Multilingual Word Sense Tagging Using Parallel Corpora: A Preliminary Investigation", 2000, SIGLEX Workshop on Word Senses and Multi-Linguality, pp. 1-9.

Grefenstette, Gregory, "The World Wide Web as a Resource for Example-Based Machine Translation Tasks", 1999, Translating and the Computer 21, Proc. of the 21st International Conf. on Translating and the Computer, London, UK, 12 pp.

Hatzivassiloglou, V. et al., "Unification-Based Glossing", 1995, Proc. of the International Joint Conference on Artificial Intelligence, pp. 1382-1389.

Ide, N. and Veronis, J., "Introduction to the Special Issue on Word Sense Disambiguation: The State of the Art", Mar. 1998, Computational Linguistics, vol. 24, Issue 1, pp. 2-40.

Imamura, Kenji, "Hierarchical Phrase Alignment Harmonized with Parsing", 2001, in Proc. of NLPRS, Tokyo.

Jelinek, F., "Fast Sequential Decoding Algorithm Using a Stack", Nov. 1969, IBM J. Res. Develop., vol. 13, No. 6, pp. 675-685.

Jones, K. Sparck, "Experiments in Relevance Weighting of Search Terms", 1979, Information Processing & Management, vol. 15, Pergamon Press Ltd., UK, pp. 133-144.

Knight, K. and Yamada, K., "A Computational Approach to Deciphering Unknown Scripts," 1999, Proc. of the ACL Workshop on Unsupervised Learning in Natural Language Processing.

Knight, K. and Al-Onaizan, Y., "A Primer on Finite-State Software for Natural Language Processing", 1999 (available at http://www.isi.edu/licensed-sw/carmel).

Knight, Kevin, "A Statistical MT Tutorial Workbook," 1999, JHU Summer Workshop (available at http://www.isi.edu/natural-language/mt/wkbk.rtf).

Knight, Kevin, "Automating Knowledge Acquisition for Machine Translation," 1997, AI Magazine 18(4).

Knight, K. and Chander, I., "Automated Postediting of Documents,"1994, Proc. of the 12th Conference on Artificial Intelligence, pp. 779-784.

Knight, K. and Luk, S., "Building a Large-Scale Knowledge Base for Machine Translation," 1994, Proc. of the 12th Conference on Artificial Intelligence, pp. 773-778.

Knight, Kevin, "Connectionist Ideas and Algorithms," Nov. 1990, Communications of the ACM, vol. 33, No. 11, pp. 59-74.

Knight, Kevin, "Decoding Complexity in Word-Replacement Translation Models", 1999, Computational Linguistics, 25(4).

Knight et al., "Filling Knowledge Gaps in a Broad-Coverage Machine Translation System", 1995, Proc. of the 14th International Joint Conference on Artificial Intelligence, Montreal, Canada, vol. 2, pp. 1390-1396.

Knight, Kevin, "Integrating Knowledge Acquisition and Language Acquisition," May 1992, Journal of Applied Intelligence, vol. 1, No. 4.

Knight et al., "Integrating Knowledge Bases and Statistics in MT," 1994, Proc. of the Conference of the Association for Machine Translation in the Americas.

Knight, Kevin, "Learning Word Meanings by Instruction,"1996, Proc. of the National Conference on Artificial Intelligence, vol. 1, pp. 447-454.

Knight, K. and Graehl, J., "Machine Transliteration", 1997, Proc. of the ACL-97, Madrid, Spain.

Knight, K. et al., "Machine Transliteration of Names in Arabic Text," 2002, Proc. of the ACL Workshop on Computational Approaches to Semitic Languages.

Knight, K. and Marcu, D., "Statistics-Based Summarization—Step One: Sentence Compression," 2000, American Association for Artificial Intelligence Conference, pp. 703-710.

Knight et al., "Translation with Finite-State Devices," 1998, Proc. of the 3rd AMTA Conference, pp. 421-437.

Knight, K. and Hatzivassiloglou, V., "Two-Level, Many-Paths Generation," 1995, 'Proc. of the 33rd Annual Conference of the ACL, pp. 252-260.

Knight, Kevin, "Unification: A Multidisciplinary Survey," 1989, ACM Computing Surveys, vol. 21, No. 1.

Koehn, P. and Knight, K., "ChunkMT: Statistical Machine Translation with Richer Linguistic Knowledge," Apr. 2002, Information Sciences Institution.

Koehn, P. and Knight, K., "Estimating Word Translation Probabilities from Unrelated Monolingual Corpora Using the EM Algorithm," 2000, Proc. of the 17th meeting of the AAAI.

Koehn, P. and Knight, K., "Knowledge Sources for Word-Level Translation Models," 2001, Conference on Empirical Methods in Natural Language Processing.

Kurohashi, S. and Nagao, M., "Automatic Detection of Discourse Structure by Checking Surface Information in Sentences," 1994, Proc. of COL-LING '94, vol. 2, pp. 1123-1127.

Langkilde-Geary, Irene, "An Empirical Verification of Coverage and Correctness for a General-Purpose Sentence Generator," 1998, Proc. 2nd Int'l Natural Language Generation Conference.

Langkilde-Geary, Irene, "A Foundation for General-Purpose Natural Language Generation: Sentence Realization Using Probabilistic Models of Language," 2002, Ph.D. Thesis, Faculty of the Graduate School, University of Southern California.

Langkilde, Irene, "Forest-Based Statistical Sentence Generation," 2000, Proc. of the 1st Conference on North American chapter of the ACL, Seattle, WA, pp. 170-177.

Langkilde, I. and Knight, K., "The Practical Value of N-Grams in Generation," 1998, Proc. of the 9th International Natural Language Generation Workshop, p. 248-255.

Langkilde, I. and Knight, K., "Generation that Exploits Corpus-Based Statistical Knowledge," 1998, Proc. of the COLING-ACL, pp. 704-710.

Mann, G. and Yarowsky, D., "Multipath Translation Lexicon Induction via Bridge Languages," 2001, Proc. of the 2nd Conference of the North American Chapter of the ACL, Pittsburgh, PA, pp. 151-158.

Manning, C. and Schutze, H., "Foundations of Statistical Natural Language Processing," 2000, The MIT Press, Cambridge, MA [redacted].

Marcu, D. and Wong, W., "A Phrase-Based, Joint Probability Model for Statistical Machine Translation," 2002, Proc. of ACL-2 conference on Empirical Methods in Natural Language Processing, vol. 10, pp. 133-139.

Marcu, Daniel, "Building Up Rhetorical Structure Trees," 1996, Proc. of the National Conference on Artificial Intelligence and Innovative Applications of Artificial Intelligence Conference, vol. 2, pp. 1069-1074.

Marcu, Daniel, "Discourse trees are good indicators of importance in text," 1999, Advances in Automatic Text Summarization, The MIT Press, Cambridge, MA.

Marcu, Daniel, "Instructions for Manually Annotating the Discourse Structures of Texts," 1999, Discourse Annotation, pp. 1-49.

Marcu, Daniel, "The Rhetorical Parsing of Natural Language Texts," 1997, Proceedings of ACL/EACL '97, pp. 96-103.

Marcu, Daniel, "The Rhetorical Parsing, Summarization, and Generation of Natural Language Texts," 1997, Ph.D. Thesis, Graduate Department of Computer Science, University of Toronto.

Marcu, Daniel, "Towards a Unified Approach to Memory- and Statistical-Based Machine Translation," 2001, Proc. of the 39th Annual Meeting of the ACL, pp. 378-385.

Melamed, I. Dan, "A Word-to-Word Model of Translational Equivalence," 1997, Proc. of the 35th Annual Meeting of the ACL, Madrid, Spain, pp. 490-497.

Melamed, I. Dan, "Automatic Evaluation and Uniform Filter Cascades for Inducing N-Best Translation Lexicons," 1995, Proc. of the 3rd Workshop on Very Large Corpora, Boston, MA, pp. 184-198.

Melamed, I. Dan, "Empirical Methods for Exploiting Parallel Texts," 2001, MIT Press, Cambridge, MA [table of contents].

Meng et al., "Generating Phonetic Cognates to Handle Named Entities in English-Chinese Cross-Language Spoken Document Retrieval," 2001, IEEE Workshop on Automatic Speech Recognition and Understanding, pp. 311-314.

Miike et al., "A full-text retrieval system with a dynamic abstract generation function," 1994, Proceedings of SI-GIR '94, pp. 152-161.

Mikheev et al., "Named Entity Recognition without Gazeteers," 1999, Proc. of European Chapter of the ACL, Bergen, Norway, pp. 1-8.

Monasson et al., "Determining computational complexity from characteristic 'phase transitions'," Jul. 1999, Nature Magazine, vol. 400, pp. 133-137.

Mooney, Raymond, "Comparative Experiments on Disambiguating Word Senses: An Illustration of the Role of Bias in Machine Learning," 1996, Proc. of the Conference on Empirical Methods in Natural Language Processing, pp. 82-91.

Niessen,S. and Ney, H, "Toward hierarchical models for statistical machine translation of inflected languages," 2001, Data-Driven Machine Translation Workshop, Toulouse, France, pp. 47-54.

Och, F. and Ney, H, "Improved Statistical Alignment Models," 2000, 38th Annual Meeting of the ACL, Hong Kong, pp. 440-447.

Och et al., "Improved Alignment Models for Statistical Machine Translation," 1999, Proc. of the Joint Conf. of Empirical Methods in Natural Language Processing and Very Large Corpora, pp. 20-28.

Papineni et al., "Bleu: a Method for Automatic Evaluation of Machine Translation," 2001, IBM Research Report, RC22176(W0102-022).

Pla et al., "Tagging and Chunking with Bigrams," 2000, Proc. of the 18th Conference on Computational Linguistics, vol. 2, pp. 614-620.

Rapp, Reinhard, Automatic Identification of Word Translations from Unrelated English and German Corpora, 1999, 37th Annual Meeting of the ACL, pp. 519-526.

Rapp, Reinhard, "Identifying Word Translations in Non-Parallel Texts," 1995, 33rd Annual Meeting of the ACL, pp. 320-322.

Resnik, P. and Yarowsky, D., "A Perspective on Word Sense Disambiguation Methods and Their Evaluation," 1997, Proceedings of SIGLEX '97, Washington, DC, pp. 79-86.

Resnik, Philip, "Mining the Web for Bilingual Text," 1999, 37th Annual Meeting of the ACL, College Park, MD, pp. 527-534.

Rich, E. and Knight, K., "Artificial Intelligence, Second Edition," 1991, McGraw-Hill Book Company [redacted].

Richard et al., "Visiting the Traveling Salesman Problem with Petri nets and application in the glass industry," Feb. 1996, IEEE Emerging Technologies and Factory Automation, pp. 238-242.

Robin, Jacques, "Revision-Based Generation of Natural Language Summaries Providing Historical Background: Corpus-Based Analysis, Design Implementation and Evaluation," 1994, Ph.D. Thesis, Columbia University, New York.

Sang, E. and Buchholz, S., "Introduction to the CoNLL-2000 Shared Task: Chunking," 20002, Proc. of CoNLL-2000 and LLL-2000, Lisbon, Portugal, pp. 127-132.

Schmid, H., and Walde, S., "Robust German Noun Chunking With a Probabilistic Context-Free Grammar," 2000, Proc. of the 18th Conference on Computational Linguistics, vol. 2, pp. 726-732.

Selman et al., "A New Method for Solving Hard Satisfiability Problems," 1992, Proc. of the 10th National Conference on Artificial Intelligence, San Jose, CA, pp. 440-446.

Schutze, Hinrich, "Automatic Word Sense Discrimination," 1998, Computational Linguistics, Special Issue on Word Sense Disambiguation, vol. 24, Issue 1, pp. 97-123.

Sobashima et al., "A Bidirectional Transfer-Driven Machine Translation System for Spoken Dialogues," 1994, Proc. of 15th Conference on Computational Linguistics, vol. 1, pp. 64-68.

Shapiro, Stuart (ed.), "Encyclopedia of Artificial Intelligence, 2nd edition", vol. 2, 1992, John Wiley & Sons Inc; "Unification" article, K. Knight, pp. 1630-1637.

Soricut et al., "Using a large monolingual corpus to improve translation accuracy," 2002, Lecture Notes In Computer Science, vol. 2499, Proc. of the 5th Conference of the Association for Machine Translation in the Americas on Machine Translation: From Research to Real Users, pp. 155-164.

Stalls, B. and Knight, K., "Translating Names and Technical Terms in Arabic Text," 1998, Proc. of the COLING/ACL Workkshop on Computational Approaches to Semitic Language.

Sun et al., "Chinese Named Entity Identification Using Class-based Language Model," 2002, Proc. of 19th International Conference on Computational Linguistics, Taipei, Taiwan, vol. 1, pp. 1-7.

Sumita et al., "A Discourse Structure Analyzer for Japanese Text," 1992, Proc. of the International Conference on Fifth Generation Computer Systems, vol. 2, pp. 1133-1140.

Taylor et al., "The Penn Treebank: An Overview," in A. Abeill (ed.), Treebanks: Building and Using Parsed Corpora, 2003, pp. 5-22.

Tiedemann, Jorg, "Automatic Construction of Weighted String Similarity Measures," 1999, In Proceedings of the Joint SIGDAT Conference on Emperical Methods in Natural Language Processing and Very Large Corpora.

Tillmann et al., "A DP based Search Using Monotone Alignments in Statistical Translation," 1997, Proc. of the Annual Meeting of the ACL, pp. 366-372.

Tillman, C. and Xia, F., "A Phrase-Based Unigram Model for Statistical Machine Translation," 2003, Proc. of the North American Chapter of the ACL on Human Language Technology, vol. 2, pp. 106-108.

Veale, T. and Way, A., "Gaijin: A Bootstrapping, Template-Driven Approach to Example-Based MT," 1997, Proc. of New Methods in Natural Language Processing (NEMPLP97), Sofia, Bulgaria.

Vogel, S. and Ney, H., "Construction of a Hierarchical Translation Memory," 2000, Proc. of Cooling 2000, Saarbrucken, Germany, pp. 1131-1135.

Vogel et al., "The CMU Statistical Machine Translation System," 2003, Machine Translation Summit IX, New Orleans, LA.

Vogel et al., "The Statistical Translation Module in the Verbmobil System," 2000, Workshop on Multi-Lingual Speech Communication, pp. 69-74.

Wang, Ye-Yi, "Grammar Interference and Statistical Machine Translation," 1998, Ph.D Thesis, Carnegie Mellon University, Pittsburgh, PA.

Watanbe et al., "Statistical Machine Translation Based on Hierarchical Phrase Alignment," 2002, 9th International Conference on Theoretical and Methodological Issues in Machin Translation (TMI-2002), Keihanna, Japan, pp. 188-198.

Witbrock, M. and Mittal, V., "Ultra-Summarization: A Statistical Approach to Generating Highly Condensed Non-Extractive Summaries," 1999, Proc. of SIGIR '99, 22nd International Conference on Research and Development in Information Retrieval, Berkeley, CA, pp. 315-316.

Wang, Y. and Waibel, A., "Decoding Algorithm in Statistical Machine Translation," 1996, Proc. of the 35th Annual Meeting of the ACL, pp. 366-372.

Wu, Dekai, "Stochastic Inversion Transduction Grammars and Bilingual Parsing of Parallel Corpora," 1997, Computational Linguistics, vol. 23, Issue 3, pp. 377-403.

Wu, Dekai, "A Polynomial-Time Algorithm for Statistical Machine Translation," 1996, Proc. of 34th Annual Meeting of the ACL, pp. 152-158.

Yamada, K. and Knight, K., "A Decoder for Syntax-based Statistical MT," 2001, Proceedings of the 40th Annual Meeting of the ACL, pp. 303-310.

Yamada, K. and Knight, K. "A Syntax-based Statistical Translation Model," 2001, Proc. of the 39th Annual Meeting of the ACL, pp. 523-530.

Yamamoto et al., "A Comparative Study on Translation Units for Bilingual Lexicon Extraction," 2001, Japan Academic Association for Copyright Clearance, Tokyo, Japan.

Yarowsky, David, "Unsupervised Word Sense Disambiguation Rivaling Supervised Methods," 1995, 33rd Annual Meeting of the ACL, pp. 189-196.

Callan et al., "TREC and TIPSTER Experiments with INQUERY," 1994, Information Processing and Management, vol. 31, Issue 3, pp. 327-343.

Cohen, Yossi, "Interpreter for FUF," (available at ftp://ftp.cs.bgu.ac.il/pub/people/elhadad/fuf-life.lf).

Mohri, M. and Riley, M., "An Efficient Algorithm for the N-Best-Strings Problem," 2002, Proc. of the 7th Int. Conf. on Spoken Language Processing (ICSLP'02), Denver, CO, pp. 1313-1316.

Nederhof, M. and Satta, G., "IDL-Expressions: A Formalism for Representing and Parsing Finite Languages in Natural Language Processing," 2004, Journal of Artificial Intelligence Research, vol. 21, pp. 281-287.

Och, F. and Ney, H., "Discriminative Training and Maximum Entropy Models for Statistical Machine Translation," 2002, Proc. of the 40th Annual Meeting of the ACL, Philadelphia, PA, pp. 295-302.

Resnik, P. and Smith, A., "The Web as a Parallel Corpus," Sep. 2003, Computational Linguistics, Special Issue on Web as Corpus, vol. 29, Issue 3, pp. 349-380.

Russell, S. and Norvig, P., "Artificial Intelligence: A Modern Approach," 1995, Prentice-Hall, Inc., New Jersey [redacted—table of contents].

Ueffing et al., "Generation of Word Graphs in Statistical Machine Translation," 2002, Proc. of Empirical Methods in Natural Language Processing (EMNLP), pp. 156-163.

Kumar, R. and Li, H., "Integer Programming Approach to Printed Circuit Board Assembly Time Optimization," 1995, IEEE Transactions on Components, Packaging, and Manufacturing, Part B: Advance Packaging, vol. 18, No. 4, pp. 720-727.

Ueffing et al., "Using Pos Information for Statistical Machine Translation into Morphologically Rich Languages," In EACL, 2003: Proceedings of the Tenth Conference on European Chapter of the Association for Computational Linguistics, pp. 347-354.

Frederking et al., "Three Heads are Better Than One," In Proceedings of the 4th Conference on Applied Natural Language Processing, Stuttgart, Germany, 1994, pp. 95-100.

Och et al., "Discriminative Training and Maximum Entropy Models for Statistical Machine Translation," In Proc. of the 40th Annual Meeting of the Association for Computational Linguistics (ACL), Philadelphia, PA, 2002.

Yasuda et al., "Automatic Machine Translation Selection Scheme to Output the Best Result," Proc of LREC, 2002, pp. 525-528.

Agbago, A., et al., "True-casing for the Portage System," In Recent Advances in Natural Language Processing (Borovets, Bulgaria), Sep. 21-23, 2005, pp. 21-24.

Alshawi, Hiyan, "Head Automata for Speech Translation", Proceedings of the ICSLP 96, 1996, Philadelphia, Pennslyvania.

Ambati, V., "Dependency Structure Trees in Syntax Based Machine Translation," Spring 2008 Report <http://www.cs.cmu.edu/~vamshi/publications/DependencyMT_report.pdf>, pp. 1-8.

Arun, A., et al., "Edinburgh System Description for the 2006 TC-STAR Spoken Language Translation Evaluation," in TC-STAR Workshop on Speech-to-Speech Translation (Barcelona, Spain), Jun. 2006, pp. 37-41.

Ballesteros, L. et al., "Phrasal Translation and Query Expansion Techniques for Cross-Language Information Retrieval," SIGIR 97, Philadelphia, PA, © 1997, pp. 84-91.

"Bangalore, S. and Rambow, O., "Using TAGs, a Tree Model, and a Language Model for Generation," May 2000,Workshop TAG+5, Paris".

Bannard, C. and Callison-Burch, C., "Paraphrasing with Bilingual Parallel Corpora," In Proceedings of the 43rd Annual Meeting on Association for Computational Linguistics (Ann Arbor, MI, Jun. 25-30, 2005). Annual Meeting of the ACL Assoc. for Computational Linguistics, Morristown, NJ, 597-604. DOI=http://dx.doi.org/10.3115/1219840.

Berhe, G. et al., "Modeling Service-based Multimedia Content Adaptation in Pervasive Computing," CF '04 (Ischia, Italy) Apr. 14-16, 2004, pp. 60-69.

Boitet, C. et al., "Main Research Issues in Building Web Services for Mutualized, Non-Commercial Translation," Proc. of the Symposium on Natural Language Processing, Human and Computer Processing of Language and Speech, © 2005, pp. 1-11.

Brill, Eric, "Transformation-Based Error-Driven Learning and Natural Language Processing: A Case Study in Part of Speech Tagging", 1995, Assocation for Computational Linguistics, vol. 21, No. 4, pp. 1-37.

Callison-Burch, C. et al., "Statistical Machine Translation with Word- and Sentence-aligned Parallel Corpora," In Proceedings of the 42nd Meeting on Assoc. for Computational Linguistics (Barcelona, Spain, Jul. 21-26, 2004). Annual Meeting of the ACL. Assoc. for Computational Linguistics, Morristown, NJ, 1.

Cheng, P. et al., "Creating Multilingual Translation Lexicons with Regional Variations Using Web Corpora," In Proceedings of the 42nd Annual Meeting on Assoc. for Computational Linguistics (Barcelona, Spain, Jul. 21-26, 2004). Annual Meeting of the ACL. Assoc. for Computational Linguistics, Morristown, NJ, 53.

Cheung et al., "Sentence Alignment in Parallel, Comparable, and Quasi-comparable Corpora", In Proceedings of LREC, 2004, pp. 30-33.

Cohen et al., "Spectral Bloom Filters," SIGMOD 2003, Jun. 9-12, 2003, ACM pp. 241-252.

Cohen, "Hardware-Assisted Algorithm for Full-text Large-Dictionary String Matching Using n-gram Hashing," 1998, Information Processing and Management, vol. 34, No. 4, pp. 443-464.

Covington, "An Algorithm to Align Words for Historical Comparison", Computational Linguistics, 1996,vol. 22, No. 4, pp. 481-496.

Eisner, Jason, "Learning Non-Isomorphic Tree Mappings for Machine Translation," 2003, in Proc. of the 41st Meeting of the ACL, pp. 205-208.

Fleming, Michael et al., "Mixed-Initiative Translation of Web Pages," AMTA 2000, LNAI 1934, Springer-Verlag, Berlin, Germany, 2000, pp. 25-29.

Och, Franz Josef and Ney, Hermann, "Improved Statistical Alignment Models" ACLOO:Proc. of the 38th Annual Meeting of the Association for Computational Lingustics, 'Online! Oct. 2-6, 2000, pp. 440-447, XP002279144 Hong Kong, China Retrieved from the Internet: <URL:http://www-i6.informatik.rwth-aachen.de/Colleagues/och/ACLOO.ps> 'retrieved on Jun. 5, 2004! abstract.

Ren, Fuji and Shi, Hongchi, "Parallel Machine Translation: Principles and Practice," Engineering of Complex Computer Systems, 2001 Proceedings, Seventh IEEE Int'l. Conference, pp. 249-259, 2001.

Fung et al, "Mining Very-Non-Parallel Corpora: Parallel Sentence and Lexicon Extraction via Bootstrapping and EM", In EMNLP 2004.

Gale, W. and Church, K., "A Program for Aligning Sentences in Bilingual Corpora," 1993, Computational Linguisitcs, vol. 19, No. 1, pp. 75-102.

Galley et al., "Scalable Inference and Training of Context-Rich Syntactic Translation Models," Jul. 2006, in Proc. of the 21st International Conference on Computational Linguistics, pp. 961-968.

Galley et al., "What's in a translation rule?", 2004, in Proc. of HLT/NAACL '04, pp. 1-8.

Gaussier et al, "A Geometric View on Bilingual Lexicon Extraction from Comparable Corpora", In Proceedings of ACL 2004, july.

Gildea, D., "Loosely Tree-based Alignment for Machine Translation," In Proceedings of the 41st Annual Meeting on Assoc. for Computational Lingusitics—vol. 1 (Sapporo, Japan, Jul. 7-12, 2003). Annual Meeting of the ACL Assoc. for Computational Linguistics, Morristown, NJ, 80-87. DOI=http://dx.doi.org/10.3115/1075096.1075107.

Grossi et al, "Suffix Trees and Their Applications in String Algorithms", In. Proceedings of the 1st South American Workshop on String Processing, Sep. 1993, pp. 57-76.

Gupta et al., "Kelips: Building an Efficient and Stable P2P DHT thorough Increased Memory and Background Overhead," 2003 IPTPS, LNCS 2735, pp. 160-169.

Habash, Nizar, "The Use of a Structural N-gram Language Model in Generation-Heavy Hybrid Machine Translation," University of Maryland, Univ. Institute for Advance Computer Studies, Sep. 8, 2004.

Huang et al., "Relabeling Syntax Trees to Improve Syntax-Based Machine Translation Quality," Jun. 4-9, 2006, in Proc. of the Human Language Techology Conference of the North Americna Chapter of the ACL, pp. 240-247.

Imamura et al., "Feedback Cleaning of Machine Translation Rules Using Automatic Evaluation," 2003 Computational Linguistics, pp. 447-454.

Klein et al., "Accurate Unlexicalized Parsing," Jul. 2003, in Proc. of the 41st Annual Meeting of the ACL, pp. 423-430.

Koehn, Philipp, "Noun Phrase Translation," A PhD Dissertation for the University of Southern California, pp. xiii, 23, 25-57, 72-81, Dec. 2003.

"Lee, Yue-Shi,"Neural Network Approach to Adaptive Learning: with an Application to Chinese Homophone Disambiguation"IEEE pp. 1521-1526."

Lita, L., et al., "tRuEcasIng," 2003, Proceedings of the 41st Annual Meeting of the Assoc. for Computational Linguistics (In Hinrichs, E. and Roth, D.-editors), pp. 152-159.

Llitjos, A. F. et al., "The Translation Correction Tool: English-Spanish User Studies," Citeseer © 2004, downloaded from: http://gs37.sp.cs.cmu.edu/ari/papers/lrec04/fontll, pp. 1-4.

McCallum, A. and Li, W., "Early Results for Named Entity Recognition with Conditional Random Fields, Feature Induction and Web-enhanced Lexicons," In Proceedings of the Seventh Conference on Natural Language Learning at HLT-NAACL, 2003, vol. 4 (Edmonton, Canada), Assoc. for Computational Linguistics, Morristown, NJ, pp. 188-191.

McDevitt, K. et al., "Designing of a Community-based Translation Center," Technical Report TR-03-30, Computer Science, Virginia Tech, © 2003, pp. 1-8.

Metze, F. et al., "The NESPOLE! Speech-to-Speech Translation System," Proc. of the HLT 2002, 2nd Int'l Conf. on Human Language Technology (San Francisco, CA), © 2002, pp. 378-383.

Mohri, Mehryar, "Regular Approximation of Context Free Grammars Through Transformation", 2000, pp. 251-261, "Robustness in Language and Speech Technology", Chapter 9, Kluwer Academic Publishers.

Nagao, K. et al., "Semantic Annotation and Transcoding: Making Web Content More Accessible," IEEE Multimedia, vol. 8, Issue 2 Apr.-Jun. 2001, pp. 69-81.

Norvig, Peter, "Techniques for Automatic Memoization with Applications to Context-Free Parsing", Compuational Linguistics,1991, pp. 91-98, vol. 17, No. 1.

Och et al. "A Smorgasbord of Features for Statistical Machine Translation." HLTNAACL Conference. Mar. 2004, 8 pages.

Och, F., "Minimum Error Rate Training in Statistical Machine Translation," In Proceedings of the 41st Annual Meeting on Assoc. for Computational Linguistics—vol. 1 (Sapporo, Japan, Jul. 7-12, 2003). Annual Meeting of the ACL. Assoc. for Computational Linguistics, Morristown, NJ, 160-167. DOI=http://dx.doi.org/10.3115-1075096.

Och, F. and Ney, H., "A Systematic Comparison of Various Statistical Alignment Models," Computational Linguistics, 2003, 29:1, 19-51.

Perugini, Saviero et al., "Enhancing Usability in CITIDEL: Multimodal, Multilingual and Interactive Visualization Interfaces," JCDL '04, Tucson, AZ, Jun. 7-11, 2004, pp. 315-324.

Petrov et al., "Learning Accurate, Compact and Interpretable Tree Annotation," Jun. 4-9, 2006, in Proc. of the Human Language Technology Conference of the North American Chapter of the ACL, pp. 433-440.

Qun, Liu, "A Chinese-English Machine Translation System Based on Micro-Engine Architecture," An Int'l Conference on Translation and Information Technology, Hong Kong, Dec. 2000, pp. 1-10.

Rayner et al.,"Hybrid Language Processing in the Spoken Language Translator," IEEE 1997, pp. 107-110.

Rogati et al., "Resource Selection for Domain-Specific Cross-Lingual IR," ACM 2004, pp. 154-161.

Zhang, R. et al., "The NiCT-ATR Statistical Machine Translation System for the IWSLT 2006 Evaluation," submitted to IWSLT, 2006.

Kumar, S. and Byrne, W., "Minimum Bayes-Risk Decoding for Statistical Machine Translation." HLTNAACL Conference. Mar. 2004, 8 pages.

Shirai, S., "A Hybrid Rule and Example-based Method for Machine Translation," 1997, NTT Communication Science Laboratories, pp. 1-5.

Tanaka, K. and Iwasaki, H. "Extraction of Lexical Translations from Non-Aligned Corpora," Proceedings of COLING 1996.

Taskar, B., et al., "A Discriminative Matching Approach to Word Alignment," In Proceedings of the Conference on Human Language Technology and Empirical Methods in Natural Language Processing (Vancouver, BC, Canada, Oct. 6-8, 2005). Human Language Technology Conference. Assoc. for Computational Linguistics, Morristown, NJ.

Tomas, J., "Binary Feature Classification for Word Disambiguation in Statistical Machine Translation," Proceedings of the 2nd Int'l. Workshop on Pattern Recognition, 2002, pp. 1-12.

Uchimoto, K. et al., "Word Translation by Combining Example-Based Methods and Machine Learning Models," Natural LanguageProcessing (Shizen Gengo Shori), vol. 10, No. 3, Apr. 2003, pp. 87-114.

Uchimoto, K. et al., "Word Translation by Combining Example-based Methods and Machine Learning Models," Natural LanguageProcessing (Shizen Gengo Shori), vol. 10, No. 3, Apr. 2003, pp. 87-114. (English Translation).

Varga et al., "Parallel Corpora for Medium Density Languages", In Proceedings of RANLP 2005, pp. 590-596.

Yamada K., "A Syntax-Based Statistical Translation Model," 2002 PhD Dissertation, pp. 1-141.

Yamamoto et al, "Acquisition of Phrase-level Bilingual Correspondence using Dependency Structure" In Proceedings of COLING-2000, pp. 933-939.

Zhang et al., "Synchronous Binarization for Machine Translations," Jun. 4-9, 2006, in Proc. of the Human Language Technology Conference of the North American Chapter of the ACL, pp. 256-263.

Zhang et al., "Distributed Language Modeling for N-best List Re-ranking," In Proceedings of the 2006 Conference on Emperical Methods in Natural Language Processing (Sydney, Australia, Jul. 22-23, 2006). ACL Workshops. Assoc. for Computational Linguistics, Morristown, NJ, 216-223.

"Patent Cooperation Treaty International Preliminary Report on Patentability and The Written Opinion, Internationalapplication No. PCT/US2008/004296, Oct. 6, 2009, 5 pgs."

Document, Wikipedia.com, web.archive.org (Feb. 24, 2004) <http://web.archive.org/web/20040222202831  /http://en.wikipedia.org/wikiiDocument>, Feb. 24, 2004.

Identifying, Dictionary.com, wayback.archive.org (Feb. 28, 2007) <http://wayback.archive.org/web/200501 01 OOOOOO*/http:////dictionary.reference.com//browse/identifying>, Feb. 28, 2005 <http://web.archive.org/web/20070228150533/http://dictionary.reference.com/browse/identifying>.

Koehn, P. et al, "Statistical Phrase-Based Translation," Proceedings of HLT-NAACL 2003 Main Papers , pp. 48-54. Edmonton, May-Jun. 2003.

Abney, S.P., "Stochastic Attribute Value Grammars", Association for Computional Linguistics, 1997, pp. 597-618.

Fox, H., "Phrasal Cohesion and Statistical Machine Translation" Proceedings of the Conference on Empirical Methods in Natural Language Processing, Philadelphia, Jul. 2002, pp. 304-311. Association for Computational Linguistics. <URL:http://acl.Idc.upenn.edu/W/W02/W02-1039.pdf>.

Tillman, C., et al, "Word Reordering and a Dynamic Programming Beam Search Algorithm for Statistical Machine Translation," 2003, Association for Computational Linguistics, vol. 29, No. 1, pp. 97-133 <URL: http://acl.Idc.upenn.edu/J/J03-1005.pdf>.

Wang, W., et al. "Capitalizing Machine Translation" In HLT-NAACL '06 Proceedings Jun. 2006. <http://www.isi.edu/natural-language/mt/hlt-naacl-06-wang.pdf>.

Langlais, P. et al., "TransType: a Computer-Aided Translation Typing System" EmbedMT '00 ANLP-NAACL 2000 Workshop: Embedded Machine Translation Systems, 2000, pp. 46-51. <http://acl.Idc.upenn.edu/W/W00/W00-0507.pdf>.

Huang et al., "A syntax-directed translator with extended domain of locality," Jun. 9, 2006, In Proceedings of the Workshop on Computationally Hard Problmens and Joint Inference in Speech and Language Processing, pp. 1-8, New York City, New York, Association for Computational Linguistics.

Melamed et al., "Statistical machine translation by generalized parsing," 2005, Technical Report 05-001, Proteus Project, New York University, http://nlp.cs.nyu.edu/pubs/.

Galley et al., "Scalable Inference and Training of Context-Rich Syntactic Translation Models," Jul. 2006, In Proceedings of the 21st International Conference on Computational Linguistics and 44th Annual Meeting of the ACL, pp. 961-968.

Huang et al., "Statistical syntax-directed translation with extended domain of locality," Jun. 9, 2006, In Proceedings of AMTA, pp. 1-8.

* cited by examiner

STATISTICAL NOUN PHRASE TRANSLATION

CROSS-REFERENCE TO RELATED APPLICATIONS

This application claims priority to U.S. Provisional Application Ser. No. 60/484,810, filed on Jul. 2, 2003, the disclosure of which is incorporated here by reference in its entirety.

ORIGIN OF INVENTION

The research and development described in this application were supported by DARPA under grant number N66001-00-1-8914. The U.S. Government may have certain rights in the claimed inventions.

BACKGROUND

Machine translation (MT) is the automatic translation from a first language (a "source" language) into another language (a "target" language). Systems that perform an MT process are said to "decode" the source language into the target language.

A statistical MT system that translates foreign language sentences, e.g., French, into English may have include the following components: a language model that assigns a probability P(e) to any English string; a translation model that assigns a probability P(f|e) to any pair of English and French strings; and a decoder. The decoder may take a previously unseen sentence f and try to find the e that maximizes P(e|f), or equivalently maximizes P(e)*P(f|e).

SUMMARY

A statistical machine translation (MT) system may include a noun phrase/prepositional phrase (NP/PP) translation subsystem to translation NP/PPs as a subtask in an MT operation.

The NP/PP translation subsystem may use a model trained on an NP/PP corpus and a decoder to generate an n-best list of candidate translations and a re-ranker to re-rank the candidate translations based on a machine learning method and additional features based on known properties of NP/PPs. In an embodiment, the machine learning method may be a maximum entropy learning method, and the features may include syntactic features and using the web as a language model.

DETAILED DESCRIPTION

Figure 1:
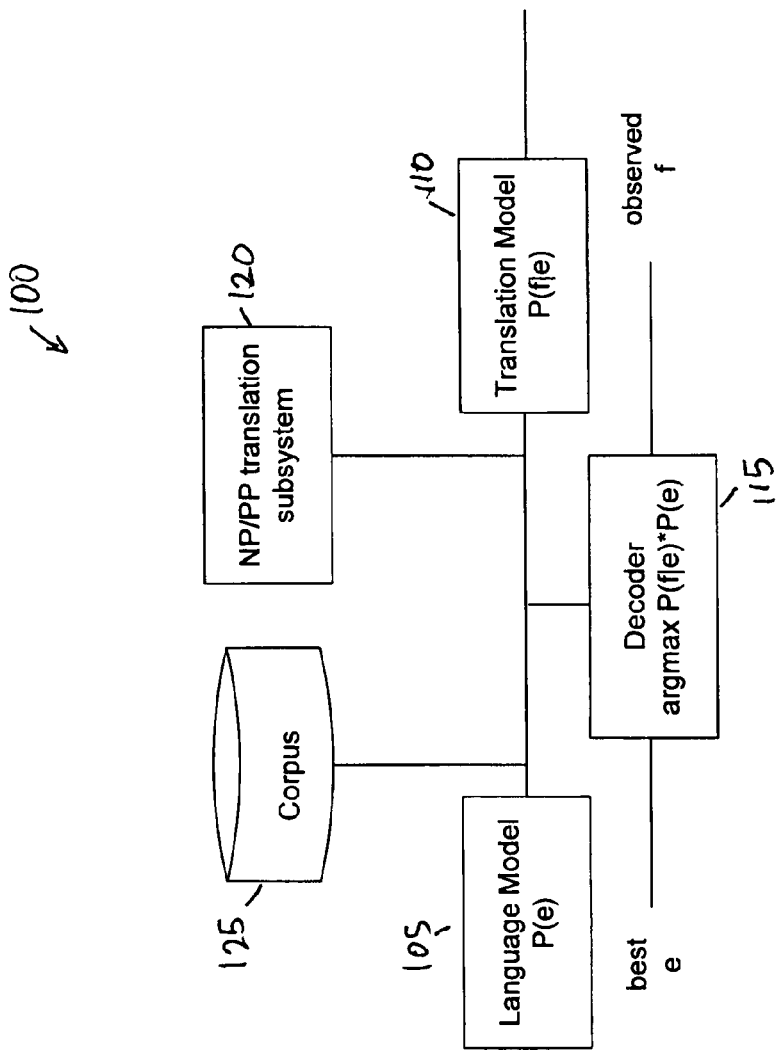
FIG. 1 is a block diagram of a statistical machine translation (MT) system including a noun phrase/prepositional phrase (NP/PP) translation subsystem.

FIG. 1 illustrates a statistical machine translation (MT) system according to an embodiment. The MT system 100 may be used to translate from a source language (e.g., French) to a target language (e.g., English). The MT system 100 may include a language model 105, a translation model 110, and a decoder 115.

The MT system 100 may be based on a source-channel model. The language model (the "source") may assign a probability P(e) to any given English sentence e. The language model 105 may be an n-gram model trained by a large monolingual corpus (or one side of a parallel corpus) to determine the probability of a word sequence.

The translation model 110 may be used to determine the probability of correctness for a translation, e.g., the probability P(f|e) of a French string f, given an English string e. The parameter values for computing P(f|e) may be learned from a parallel corpus including bilingual sentence pairs. The translation model may be, for example, an IBM translation model 4, described in U.S. Pat. No. 5,477,451.

The decoder 115 may be used to identify the best translation by maximizing the product of P(e)*P(f|e). In an embodiment, the decoder may be a greedy decoder, such as that described in co-pending application Ser. No. 09/854,327, filed on May 11, 2001, incorporated herein in its entirety.

In an embodiment, the translation of noun phrases (NPs) and prepositional phrases (PPs) may be performed as a subtask of an MT operation. The MT system 100 may include NP/PP translation subsystem 120. The NP/PP translation subsystem 120 may translate the NP/PPs in a sentence in a source language, e.g., German, that can be translated into NP/PPs in a target language, e.g., English. The NP/PP translation subsystem 120 may then provide the translations to the MT system 100. The MT system 100 may treat the translated NP/PP(s) as fixed translations, i.e., incorporate them into the full translation without changing them.

Certain source language NP/PPs may not translate to NP/PPs in the target language. The NP/PP translation subsystem 120 may treat such NP/PPs as special cases, and handle them separately.

Figure 2:
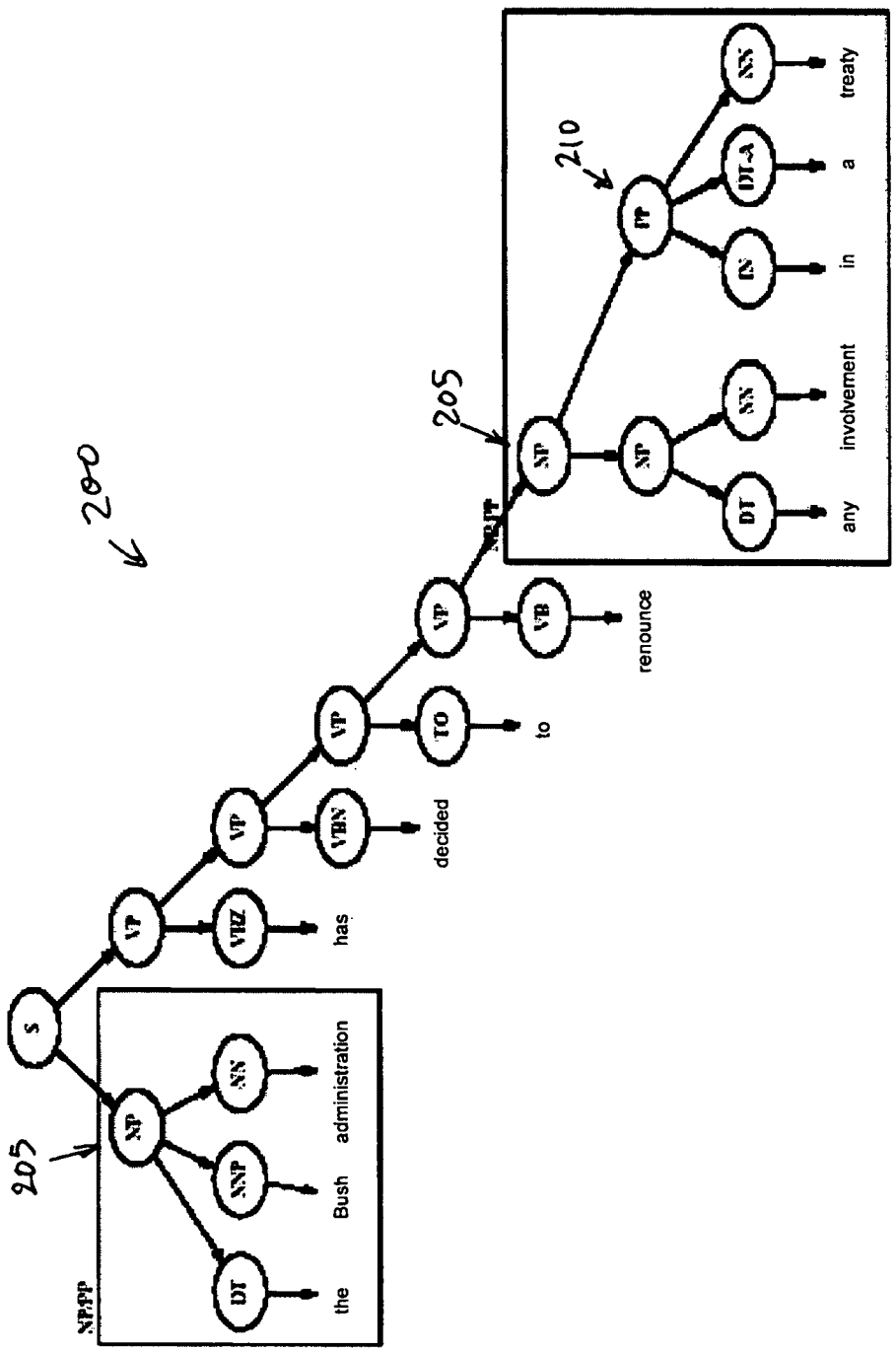
FIG. 2 illustrates a syntactic parse tree for a sentence including NP/PPs.

FIG. 2 illustrates a syntactic parse tree 200 for a sentence s that includes NPs 205 and PP 210. In the NP/PP translation subsystem 120, the NP/PPs of the sentence s are the subtrees $t_i$ that contain at least one noun and no verb, and which are not part of a larger subtree that contains no verb.

Figure 3:
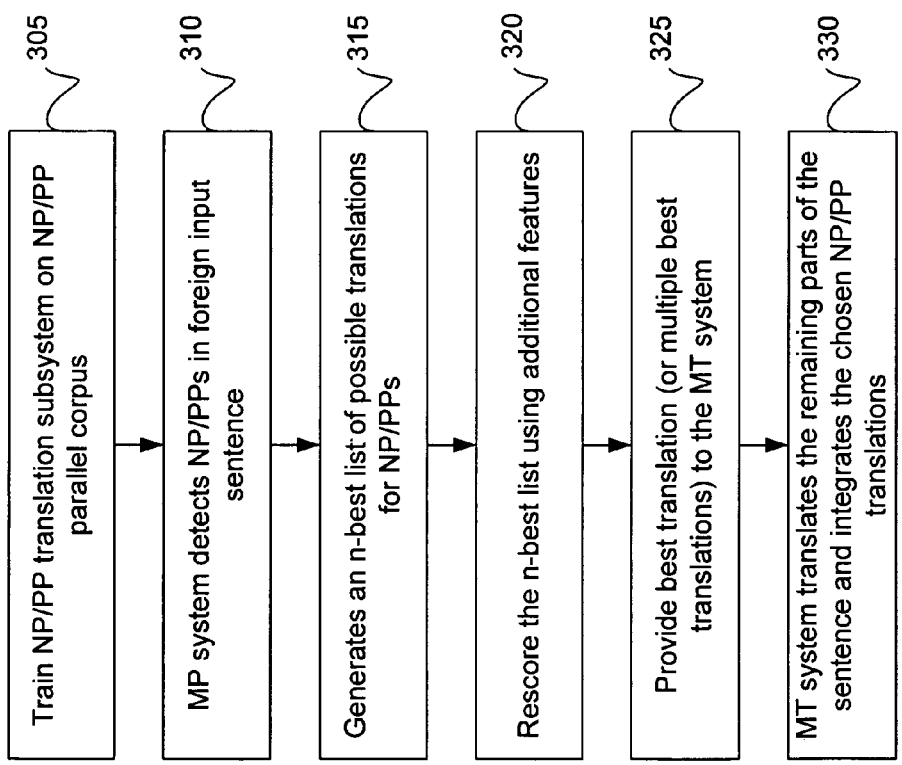
FIG. 3 is a flowchart describing a process for training and using an NP/PP translation subsystem.

FIG. 3 is a flowchart describing a process for training and using the NP/PP translation subsystem 120 in the MT system 100. The NP/PP translation subsystem may use the same modeling as the overall system (e.g., IBM Model 4), but be trained on only NP/PPs (block 305), e.g., an NP/PP corpus derived from a parallel corpus 125 used to train the MT system 100 (FIG. 1). The MT system 100 may detect NP/PPs in an input foreign language sentence (block 310) and provide them to the NP/PP translation subsystem 120 for translation. The NP/PPs may be translated in isolation, e.g., without the assistance of sentence context.

Figure 4:
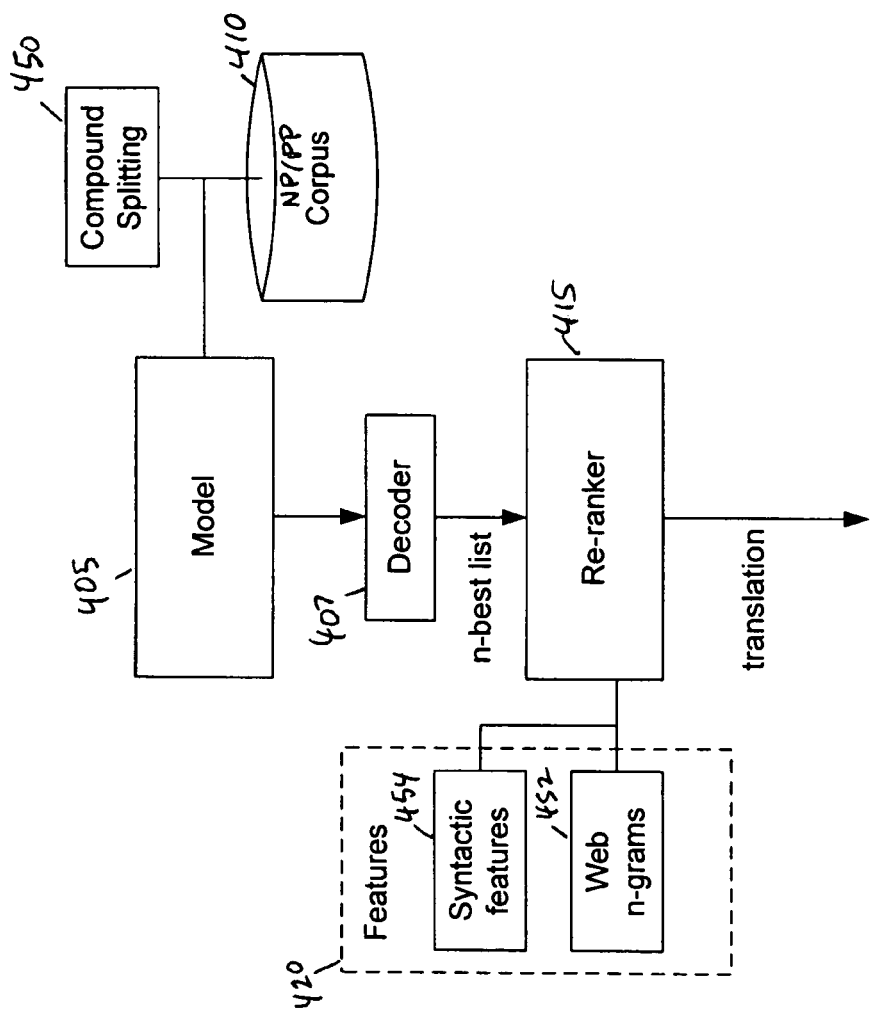
FIG. 4 is a block diagram of an NP/PP translation subsystem according to an embodiment.

FIG. 4 shows an NP/PP translation subsystem according to an embodiment. The NP/PP translation subsystem uses the model 405 and a decoder 407 to generate an n-best list of possible translations (block 315). The NP/PP translation subsystem may include a re-ranker 415 to rescore the n-best list using additional features 420 (block 320). The best translation (or multiple best translations) may then be passed on to the MT system 100 (block 325), which in turn translates the remaining parts of the sentence and integrates the chosen NP/PP translation(s) (block 330).

The NP/PP training corpus 410 may be created by extracting NP/PPs from a parallel corpus, e.g., the parallel corpus 125. The corpus 410 may be word-aligned using, e.g., the toolkit Giza++, which is described in Ouch and Ney, "Discriminative training and maximum entropy models for statistical machine translation," Proceedings of ACL (2000). Both sides of the parallel corpus may then be parsed with syntactic parsers. This may facilitate detection of the NP/PPs in an input sentence.

In an embodiment, the model 405 may be a phrase translation model that extracts its phrase translation table from word alignments generated by the Giza++ toolkit. Details of this model are described in co-pending application Ser. No. 10/402,350, filed Mar. 27, 2003, which is incorporated herein in its entirety.

The decoder 407 may be a beam search decoder, which employs hypothesis recombination and stores the search states in a search graph which can be mined with standard finite state machine methods for n-best lists. An exemplary beam search decoder is described in Ueffing et al., "Generation of word graphs in statistical machine translation," Proceedings of Empirical Methods in Natural Language Processing (EMNLP) (2002).

The re-ranker 415 may re-rank the n-best list provided by the decoder 407 using a maximum entropy learning method. The decoder 407 may annotate the n-best list of candidate translations with accuracy judgments based on the probability scores that the model assigns to each candidate translation. The initial features are the logarithm of probability scores, i.e., the language model score, the phrase translation score, and the reordering (distortion) score. The task for the learning method is to find a probability distribution p(e|f) that indicates if the candidate translation e is an accurate translation of the input f. The decision rule to pick the best translation is $e_{best}=\arg \max_e p(e|f)$ Maximum entropy was chosen for its ability to deal with both real-valued and binary features. In alternative embodiments, other machine learning systems, such as support vector machines, may also be used.

The corpus 410 provides the empirical probability distribution by distributing the probability mass of the acceptable translations $\{e_{a_e}|f\}:\tilde{p}(e_{a_e}|f)=|\{e_{a_e}|f\}|^{-1}$. If none of the candidate translations for a given input f is acceptable, the NP/PP translation subsystem may select the candidates translations that are closest to reference translations measured by minimum edit distance.

The maximum entropy framework parameterizes the probability distribution as $p_\lambda(e|f)=\exp\Sigma_i \lambda_i h_i(f,e)$ where $h_i$'s are the feature values and the $\lambda_i$'s are the feature weights. Since the NP/PP translation subsystem may have only a sample of the possible translations e for the given input f, the probability distribution may be normalized so that $\Sigma_i p_\lambda(e_i|f)=1$ for a sample $\{e_i\}$ of candidate translations.

Maximum entropy learning finds a set of feature values $\lambda_i$ so that $E_{p\lambda}[h_i]=E_{\tilde{p}}[h_i]$ for each $h_i$. These expectations are computed as sums over all candidate translations e for all inputs f: $\Sigma_{(f,e)}\tilde{p}(f)p\lambda(e|f)h_i(f,e)=\Sigma_{(f,e)}\tilde{p}(f)\tilde{p}(e|f)h_i(f,e)$ The NP/PP translation subsystem may exploit certain properties of NP/PP translation in order to improve NP/PP translation. The first of these (compounding of words) is addressed by preprocessing, while the others motivate features which are used in n-best list re-ranking.

Compounding of words, especially nouns, is common in a number of languages (German, Dutch, Finnish, Greek), and may pose a problem for machine translation. For example, the German word "Aktionsplan" may not be known to the system, but if the word were broken up into "Aktion" and "Plan", the system could easily translate it into "action plan", or "plan for action". The issues for breaking up compounds include knowing the morphological rules for joining words, resolving ambiguities of breaking up a word (e.g., "Hauptsturm"→"Haupt-Turm" or "Haupt-Sturm"), and finding the right level of splitting granularity (e.g., "Frei"-"Tag" or "Freitag").

In an embodiment, the NP/PP translation subsystem may include a compound splitting module 450, such as that described in application Ser. No. 10/884,174, filed on Jul. 2, 2004 , now U.S. Pat. No. 7,711,545, and entitled, "Empirical Methods for Splitting Compound Words With Application to Machine Translation". The compound splitting module may first collect frequency statistics over words in a training corpus. Compounds may be broken up only into known words in the corpus. For each potential compound the compound splitting module may check if morphological splitting rules allow the compound to be broken up into such known words. The compound splitting module may then pick a splitting option S (perhaps not breaking up the compound at all) with highest geometric mean of word frequencies of its n parts $p_i$:

$$S_{best} = \mathrm{argmax}_s \left( \prod_{p_i \in S} \mathrm{count}(p_i) \right)^{\frac{1}{n}}.$$

The German side of both the training and testing corpus may be broken up in this manner. The model may be trained on a compound-split corpus, and the input broken up before being passed on to the system.

The compound splitting module may work well with a phrase-based translation model, which can recover more easily from too eager or too timid splits than word-based models.

One of the features 420 used for re-ranking the n-best list may be web n-grams 452, in which the web may be used as a language model. Preliminary studies indicated that 30% of all 7-grams in new text can be also found on the web, as measured by consulting the search engine Google™, which currently indexes 3 billion web pages. This is only the case for 15% of 7-grams generated by the base translation system.

In an embodiment, the following binary features may be used: Does the candidate translation as a whole occur in the web? Do all n-grams in the candidate translation occur on the web? Do all n-grams in the candidate translation occur at least 10 times on the web? Both positive and negative features may be used for n-grams of the size 2 to 7.

In alternative embodiments the web may be integrated into the system by building a traditional n-gram language model, by using the web frequencies of the n-grams in a candidate translation, or by checking if all n-grams in a candidate translation occur on the web. Smoothing may be used to account for noise.

Syntactic features 454 may also be used for re-ranking. Syntactic features are computed over the syntactic parse trees of both input and candidate translation. The re-ranker may keep the syntactic parse tree inherited from the NP/PP detection process for the input NP/PPs. A part-of-speech tagger and syntactic parser may be used to annotate the candidate translation with its most likely syntactic parse tree.

In an embodiment, the following syntactic features may be used: preservation of the number of nouns; preservation of prepositions; and within a base NP/PP the determiner generally agree in number with the final noun (e.g., not: "this nice green flowers"). The features may be realized as integers, e.g., how many nouns did not preserve their number during translation? These features encode relevant general syntactic knowledge about the translation of noun phrases, and constitute soft constraints that may be overruled by other components of the system.

In an experiment, the Europarl corpus was used as the training corpus. The Europarl corpus is derived from the European parliament proceedings and consists of 20 million words of German (available at http://www.isi.edu/publications/europarl/). In this corpus, only part of the NP/PPs are translated as such into the foreign language. In addition, the word-alignment and syntactic parses may be faulty. As a consequence, in an experiment, only 43.4% of all NP/PPs could be aligned initially. This number was raised to 67.2% using a number of automatic data cleaning steps. The NP/PPs that partially aligned were broken up, and systematic parse errors were fixed. Certain word types that were inconsistently tagged as nouns in the two languages were harmonized (e.g., the German "wo" and the English "today"). Because adverb+ NP/PP constructions (e.g., "specifically this issue") were inconsistently parsed, the adverb was always stripped from these constructions. In addition, German verbal adjective constructions were broken up if they involved arguments or adjuncts (e.g., "der von mir gegessene Kuchen"="the by me eaten cake"), because this poses problems more related to verbal clauses. Also, alignment points involving punctuation were stripped from the word alignment, and punctuation was stripped from the edges of NP/PPs.

A total of 737,388 NP/PP pairs were collected from the Europarl corpus as training data. German NP/PPs that did not consistently align to NP/PPs in English were detected at this point. The NP/PP translation subsystem may use the obtained data of unaligned NP/PPs for dealing with these special cases.

To evaluate these methods, all of the 1362 NP/PPs in 534 sentences from parts of the Europarl corpus which are not already used as training data were detected. The evaluation metric was human assessment: Can the translation provided by the system be part of an acceptable translation of the whole sentence? In other words, the noun phrase has to be translated correctly given the sentence context. The NP/PPs were extracted in the same way that NP/PPs were initially detected for the acquisition of the NP/PP training corpus. As a result, there were some problems with parse errors, leading to sentence fragments extracted as NP/PPs that cannot be translated correctly. Also, the test corpus contained all detected NP/PPs, even untranslatable ones.

The performance of the NP/PP translation subsystem was evaluated on the set of 1362 NP/PPs extracted from 534 sentences. The contributions of different components of the system are displayed in Table 1. Starting from the IBM Model 4 baseline, gains were achieved using a phrase-based translation model (+5.5%), applying compound splitting to training and test data (+2.8%), re-estimating the weights for the system components using the maximum entropy re-ranking frame-work (+1.5%), adding web count features (+1.7%) and syntactic features (+0.8%). Overall an improvement of 12.3% was achieved over the baseline. Improvements of 2.5% are statistically significant given the size of our test corpus.

TABLE 1

| System | NP/PP Correct | | BLEU |
| --- | --- | --- | --- |
| IBM Model 4 | 724 | 53.2% | 0.172 |
| Phrase Model | 800 | 58.7% | 0.188 |
| Compound Splitting | 838 | 61.5% | 0.195 |
| Re-Estimated Param. | 858 | 63.0% | 0.197 |
| Web Count Features | 881 | 64.7% | 0.198 |
| Syntactic Features | 892 | 65.5% | 0.199 |

Table 1 also provides scores for overall sentence translation quality. The chosen NP/PP translations are integrated into a general IBM Model 4 system that translates whole sentences. Performance is measured by the BLEU score, which measures similarity to a reference translation, and is described in Papineni et al., "BLEU: a method for automatic evaluation of machine translation," Proceedings of the 40th Annual Meeting of the ACL (2002). As reference translation we used the English side of the parallel corpus. The BLEU scores track the improvements of our components, with an overall gain of 0.027.

According to exemplary embodiments, a machine translation system may include a machine-readable medium having executable instructions embodied thereon. The instructions are executable or otherwise operative to cause the machine translation system to perform a number of tasks. More specifically, the instructions may be executable to cause the machine translation system to detect a noun phrase and/or a prepositional phrase in an input string in a source language, generate a translation in a target language for the noun phrase and/or the prepositional phrase, and generate a translation of the input string in the target language including the translation for the noun phrase and/or the prepositional phrase. The instructions may also be executable to cause the machine translation system to generate a ranked n-best list of candidate translations and re-rank the n-best list using a machine learning article.

A number of embodiments have been described. Nevertheless, it will be understood that various modifications may be made without departing from the spirit and scope of the invention. Accordingly, other embodiments are within the scope of the following claims.

The invention claimed is:

1. A method comprising:
receiving by a machine translation system an input string in a source language;
detecting by the machine translation system a noun phrase and a prepositional phrase in the input string;
generating by the machine translation system possible translations in a target language for the noun phrase and the prepositional phrase;
generating a ranked n-best list of candidate translations for the possible translations of the noun phrase and the prepositional phrase;
generating by the machine translation system a translation of a remaining portion of the input string in the target language; and
integrating the one or more n-best translations for the noun phrase and the prepositional phrase into the translation of the remaining portion of the input string to generate one or more sentence translations.

2. The method of claim 1, wherein said generating the translation for the noun phrase and the prepositional phrase comprises generating the translation using a first model; and wherein said generating the translation of the input string comprises generating the translation using a second model different than the first model.

3. The method of claim 2, wherein the first model comprises a model trained using a corpus consisting of noun phrases and prepositional phrases.

4. The method of claim 2, wherein the first model comprises a phrase-based model.

5. The method of claim 1, wherein said generating possible translations for the noun phrase and the prepositional phrase comprises:
re-ranking the n-best list using a machine learning method.

6. The method of claim 5, wherein said machine learning method comprises a maximum entropy learning method.

7. The method of claim 5, wherein said re-ranking comprises re-ranking using one or more additional features based on known properties of noun phrases and prepositional phrases.

8. The method of claim 7, wherein the one or more additional features comprise syntactic features.

9. The method of claim 7, wherein the one or more additional features comprises using the web as a language model.

10. A machine translation system comprising:
a parser stored by a machine-readable medium and executable by a processor and stored in a memory to cause the machine translation system to detect a noun phrase and a prepositional phrase in an input string in a source language;
a translation subsystem including,
a first model stored by a machine-readable medium and executable by a processor and stored in a memory to cause the machine translation system to generate possible translations in a target language for the noun phrase and the prepositional phrase,
a first decoder stored by a machine-readable medium and executable to cause the machine translation system to generate a ranked n-best list including the possible translations, and
a selector to select a translation for the noun phrase and the prepositional phrase;
a second model stored by a machine-readable medium and executable to cause the machine translation system to generate possible translations in the target language for the input string in the source language, each of the possible translations comprising the selected translation for the noun phrase and the prepositional phrase; and
a second decoder to select one of the possible translations for the input string.

11. The machine translation system of claim 10, wherein the first model comprises a model trained using a corpus consisting of noun phrases and prepositional phrases.

12. The machine translation system of claim 10, wherein the first model comprises a phrase-based model.

13. The machine translation system of claim 10, wherein the translation subsystem further comprises:
a re-ranker to re-rank the n-best list using a machine learning method.

14. The machine translation system of claim 13, wherein the machine learning method comprises a maximum entropy learning method.

15. The machine translation system of claim 13, wherein the re-ranker is operative to re-rank the n-best list using one or more additional features based on known properties of noun phrases and prepositional phrases.

16. The machine translation system of claim 15, wherein the one or more additional features comprise syntactic features.

17. The machine translation system of claim 15, wherein the one or more additional features comprises using the web as a language model.

18. An article comprising a non-transitory machine-readable medium including machine-executable instructions, the instruction operative to cause a machine to:
detect a noun phrase and a prepositional phrase in an input string in a source language;
generate possible translations in a target language for the noun phrase and the prepositional phrase;
generate a ranked n-best list of candidate translations for the possible translations of the noun phrase and the prepositional phrase;
generate a translation of a remaining portion of input string in the target language; and
integrate the one or more n-best translations for the noun phrase and the prepositional phrase into the translation of the remaining portion of the input string to generate one or more sentence translations.

19. The article of claim 18, wherein the instructions for generating the translation for the noun phrase and the prepositional phrase comprise instructions operative to cause the machine to generate the translation using the first model; and wherein the instructions for generating the translation of the input string comprise instructions operative to cause the machine to generate the translation using a second model.

20. The article of claim 19, wherein the first model comprises a model trained using a corpus consisting of noun phrases and prepositional phrases.

21. The article of claim 19, wherein the first model comprises a phrase-based model.

22. The article of claim 18, wherein the instructions for generating possible translations for the noun phrase and the prepositional phrase comprise instructions operative to cause the machine to:
re-rank the n-best list using a machine learning article.

23. The article of claim 22, wherein said machine learning article comprises a maximum entropy learning article.

24. The article of claim 22, wherein the instructions for re-ranking comprise instructions operative to cause the machine to re-rank using one or more additional features based on known properties of noun phrases and prepositional phrases.

25. The article of claim 24, wherein the one or more additional features comprise syntactic features.

26. The article of claim 24, wherein the one or more additional features comprises using the web as a language model.

* * * * *